United States Patent [19]

Najjar et al.

[11] Patent Number: 5,005,986

[45] Date of Patent: Apr. 9, 1991

[54] SLAG RESISTANT THERMOCOUPLE SHEATH

[75] Inventors: Mitri S. Najjar, Wappingers Falls, N.Y.; Arnulf Muan, Lacey Spring, Va.

[73] Assignee: Texaco Inc., White Plains, N.Y.

[21] Appl. No.: 367,930

[22] Filed: Jun. 19, 1989

[51] Int. Cl.$^5$ .................. G01K 1/10; G01K 1/08
[52] U.S. Cl. ........................ 374/179; 374/139; 374/125; 374/208; 136/230; 136/234; 420/505; 420/463
[58] Field of Search ............... 374/208, 179, 139, 140, 374/125; 136/230, 232, 234; 420/505, 463; 431/121

[56] References Cited

U.S. PATENT DOCUMENTS

| 3,802,926 | 4/1974 | Blencowe | 136/230 |
| 4,222,900 | 9/1980 | Bohl | 156/664 |
| 4,468,370 | 8/1984 | Masumoto et al. | 420/463 |
| 4,517,156 | 5/1985 | Masumoto et al. | 420/463 |
| 4,684,416 | 8/1987 | Masumoto et al. | 420/463 |
| 4,776,705 | 10/1988 | Najjar et al. | 374/141 |
| 4,796,671 | 1/1989 | Furushima et al. | 374/139 |

FOREIGN PATENT DOCUMENTS

| 2206397 | 8/1973 | Fed. Rep. of Germany | 420/463 |
| 2590980 | 6/1987 | France | 374/179 |

Primary Examiner—William A. Cuchlinski, Jr.
Assistant Examiner—Diego F. F. Gutierrez
Attorney, Agent, or Firm—Robert A. Kulason; James J. O'Loughlin; Albert Brent

[57] ABSTRACT

This invention pertains to an improved high temperature slag resistant thermocouple sheath for protecting thermocouples used to measure the temperature of synthesis gas, reducing gas, or fuel gas produced by the partial oxidation of ash-containing liquid hydrocarbonaceous and/or solid carbonaceous fuels. The protection thermocouple sheath is made from a continuous binary alloy consisting of about 30 to 70 wt. % of palladium and the remainder silver. It may be used over a temperature range of about 1000° F. to 2400° F.

12 Claims, 1 Drawing Sheet

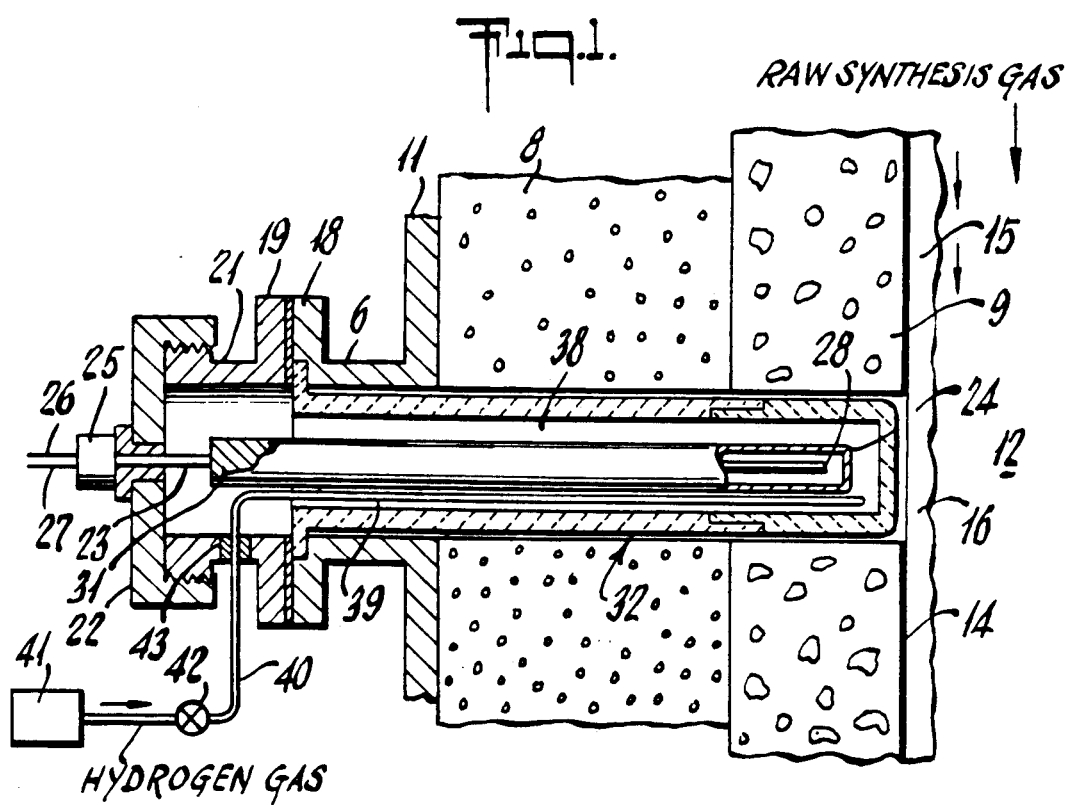

SLAG RESISTANT THERMOCOUPLE SHEATH

BACKGROUND OF THE INVENTION

1. Field Of The Invention

This invention concerns an improved thermocouple for the temperature measurement of hot gases produced by the partial oxidation of ash-containing liquid hydrocarbonaceous and/or solid carbonaceous fuels. More specifically, it concerns a high temperature slag resistant thermocouple sheath.

2. Description Of The Prior Art

Thermocouples are used for measuring temperature in the well-known high temperature partial oxidation system for producing synthesis gas, reducing gas, and fuel gas. Thermocouples are pairs of insulated wires of dissimilar metals which are connected at both ends. When the two junctions of the wires e.g. $T_2$ and $T_1$ are at different temperatures, a difference in electrical potential exists between them. The thermal electromotive force (e.m.f) is a measure of the difference in temperature between $T_2$ and $T_1$. A voltage-measuring instrument placed in the thermocouple circuit will measure temperature. For example, a sensitive high-temperature thermocouple consisting of platinum-platinum 10% rhodium will generate an e.m.f. of 9.457 millivolts and 17.339 millivolts when the differences between the hot junction and the cold junction in degrees F are respectively 1800 and 3000. Other pairs of metals e.g. chromel-alumel and iron-constantan are used to measure lower temperatures.

A corrosive atmosphere prevails during the operation of a high temperature partial oxidation gasifier. Any unprotected thermocouple in this atmosphere will be attacked and rendered useless, and especially when iron is present in the reaction zone. Various metals, alloys and refractory materials have been used in the past to form thermocouple protective sheaths. However, these materials were found to be unsuitable for long-time operation in partial oxidation systems where the temperature at various locations exceeds 1000° F. Impurities in liquid hydrocarbonaceous fuels and solid carbonaceous fuels, especially iron, readily attack thermocouples. Some noble metals e.g. platinum were found to be a sink for iron. Daily replacement of thermocouple sheaths made from these materials was not unusual. Iron-containing materials e.g. iron oxide are a major additive component in the gasification of fuels such as heavy liquid hydrocarbonaceous fuel and/or solid carbonaceous fuel that already contain iron, vanadium and nickel impurities. See related U.S. Pat. No. 4,668,428, which is incorporated herein by reference.

In coassigned U.S. Pat. No. 4,776,705, which is incorporated herein by reference, a thermocouple is enclosed in a noble metal protective sheath which in turn is inserted inside a multi-segment refractory thermowell. An annular space formed between the outside surface of the sheath and the inside surface of the thermowell is continuously purged with an oxidizing gas or gaseous mixture. Gasification products from the residual slag, which are normally in a form that react with and destroy the thermocouple wires, are neutralized or oxidized within the annular space by reaction with the purge gas mixtures. In contrast, advantageously by the subject invention, the aforesaid purge gas is eliminated, during the partial oxidation reaction, temperature measurements are more accurate, and the design of the thermocouple is simplified at a significant cost savings.

SUMMARY OF THE INVENTION

Briefly, this invention concerns a protective metal sheath for enclosing a thermocouple. The sheath is made from a continuous binary alloy consisting of about 30 to 70 wt. % of palladium and the remainder is silver. The thermocouple is used for measuring the high temperatures e.g. about 1000° F. to 2400° F. that are produced in the partial oxidation system wherein an ash-containing liquid hydrocarbonaceous and/or solid carbonaceous fuel is reacted by partial oxidation with a free-oxygen containing gas in the presence of a temperature moderator. A gaseous stream comprising $H_2$, CO, $CO_2$ and at least one member from the group consisting of $H_2O$, $N_2$, $H_2S$, COS, Ar, and $CH_4$, as well as slag containing free metal is produced in the gasifier. Without said metal protective sheath, the thermocouple would be attacked and rendered useless by contact with metal constituents found in the slag, e.g. iron, vanadium. Further, hydrogen from the product gas passes through the protective Pd-Ag alloy sheath, and converts any oxides of vanadium in the +5 oxidation state to noncorrosive oxides of vanadium in the lower oxidation states.

BRIEF DESCRIPTION OF THE DRAWING

FIG. 1 is a segmentary view in cross-section of a portion of a reactor wall in which a thermocouple and thermowell are installed.

DESCRIPTION OF THE INVENTION

Gaseous mixtures comprising $H_2$, CO, $CO_2$ and at least one member from the group consisting of $H_2O$, $N_2$, $H_2S$, COS, Ar, and $CH_4$, along with particulate carbon ash and/or molten slag are known by the names synthesis gas, fuel gas, and reducing gas depending on such factors as chemical composition and end use. These gas mixtures are most commonly prepared by the well-known partial oxidation process in the reaction zone of a free-flow, down-flowing vertical refractory lined steel pressure vessel, such as shown and described in coassigned U.S. Pat. No. 2,818,326 which is incorporated herein by reference. The feed to the gasifier is an ash-containing heavy liquid hydrocarbonaceous fuel selected from the group consisting of virgin crude, residua from petroleum distillation and cracking, petroleum distillate, reduced crude, liquid hazardous and non-hazardous waste materials, whole crude, coal derived oil, shale oil, tar sand oil, and mixtures thereof. Alternatively, the feed to the gasifier may be dry feeds or liquid slurries of an ash-containing solid carbonaceous fuel selected from the group consisting of coal, such as anthracite, bituminous, subbituminous; coke from coal; lignite; residue derived from coal liquifaction; oil shale; tar sands; petroleum coke; asphalt; pitch; particulate carbon (soot), solid carbon-containing waste materials e.g. sewage, and mixtures thereof.

The feed is introduced preferably downwardly, into the reaction zone by way of an annular passage e.g. intermediate in a burner mounted in the top of the gasifier. A suitable annulus type burner is shown in coassigned U.S. Pat. No. 2,928,460, which is incorporated herein by reference. Simultaneously, a stream of free-oxygen containing gas with, or without a temperature moderator e.g. $H_2O$, $CO_2$ is introduced into the reaction zone by way of at least one passage in said burner e.g. central and/or outer passages. The free-oxygen containing gas is selected from the group consisting of air, oxygen-enriched air i.e. greater than 21 mole % oxygen, and substantially pure oxygen i.e. greater than 95 mole % oxygen. The atomic ratio of free-oxygen in the oxidant to C in the feedstock is in the range of about 0.7 to 1.5, such as about 0.80 to 1.2. The $H_2O$ to fuel weight ratio is in the range of about 0.3 to 1.0, such as about 0.5 to 0.8.

The feed streams passing through the burner impinge downstream from the face of the burner and an autogenous reaction takes place at a temperature in the range of about 1700° F. to 2650° F. and a pressure in the range of about 5 to 250 atmospheres to produce a raw stream of synthesis gas, reducing gas, or fuel gas depending on the chemical composition of the gas. While all of these gases comprise $H_2+CO$, the $H_2/CO$ mole ratio is controlled in synthesis gas as required for downstream catalytic synthesis of specific chemicals. Reducing gas generally has a greater $H_2/CO$ mole ratio. Fuel gas contains a greater amount of $CH_4$ and has a higher specific heat.

Temperatures in the range of about 1000° F., to 2400° F., which occur at various locations in the partial oxidation gasification system, may be measured by thermocouples containing the subject invention comprising an improved palladium-silver alloy protective sheath. The thermocouples are fabricated from commercially available noble metal thermocouple wire pairs, such as type B platinum/rhodium wire pairs. Except where the pairs of wires are joined to each other at the hot and cold junctions, each wire is electrically insulated from the other and from said alloy protective sheath by a high temperature ceramic material, such as alumina or magnesia. The pairs of wires are enclosed in the palladium-silver alloy sheath which has a thickness of about 0.005" to 0.10". This sheath is resistant to attack from the slag, and in particular, free metals in the slag e.g. Fe.

Advantageously, during gasification hydrogen in the process gas stream on the outside of the protective sheath passes through the walls of the Pd-Ag protective alloy sheath and provides a reducing atmosphere around the thermocouple wire pairs within the protective sheath. Any oxides of vanadium in the +5 oxidation state which are highly corrosive to the thermocouple wires and the alloy sheath, are reduced by said hydrogen-containing gas to non-corrosive oxides of vanadium in the lower oxidation states e.g. +4, +3, +2. Advantageously, the hydrogen comes from the synthesis gas that is being produced in the gasifier at no additional cost. Further, during operation no pumping equipment is needed to introduce the hydrogen into the thermocouple assembly.

The melting point of the Pd-Ag alloy protective sheath controls the use of the improved thermocouple for measuring temperatures in the range of about 1000° F. to 2400° F. For example, they may be used in the following places:

1. In the lower half of the partial oxidation gasifier above and below the central outlet located in the bottom of the gasifier. Note that a quench ring attached to the bottom of the gasifier will cool the bottom wall of the vertical gasifier, and the central effluent gas discharge passage. See coassigned U.S. Pat. No. 4,801,307, which is incorporated herein by reference.
2. In a secondary reaction zone or plenum chamber located downstream from the gasifier. See U.S. Pat. No. 4,778,484, which is incorporated herein by reference.

The various parts, their functions, and their interrelationship in the novel thermocouple disclosed, are most readily understood by referring to FIG I. Said Figure shows the invention installed in the combustion chamber of a typical free flow vertical reactor used for producing a usable gas by the partial oxidation of coal. One such reactor is shown and described in U.S. Pat No. 4,466,808. The raw synthesis gas containing entrained molten slag flows down the inside passage 12 of the gasifier. Molten slag 15 deposits out on the inside walls 14 of the refractory lining.

The downstream tips of the noble metal wires 26 and 27 are joined at the hot thermocouple junction 28. The upstream tips of the wires are joined at the cold thermocouple junction (not shown). The wires are surrounded by the Pd-Ag alloy protective sheath 24 which is closed adjacent to the hot thermocouple junction end. Except for being permeable to hydrogen, the sheath forms an essentially gas tight housing. The upstream ends of the thermocouple wires 26 and 27 extend past the back end of the protective sheath 24 and pass through a pressure sealing fitting 25. A plug 31 formed of high temperature epoxy and/or other high temperature cement defines a gas tight seal at the upstream end of the protective sheath. The pressure seal fitting contacts a bushing which fits into a removable threaded end cap 22. The thermocouple assembly is passed in succession straight through a threaded flanged nozzle 19 which mates with flanged inlet nozzle 18 that is attached to the outer steel wall 11 of the pressure vessel reactor 10, then through a hole in the steel wall of the pressure vessel, and then through a hole in refractory 8-9 which lines the inside wall of the pressure vessel. For example, one or more thermocouples may be installed near the bottom outlet of the reaction zone.

The thermocouple assembly is held in place by screwing together the threaded end cap 22 and the threaded flanged nozzle 2I. Mating flanges which are bolted or clamped together, also my be used. The tip of the metal alloy protective sheath 24 is retracted about ½" to 3" from the face of the steel wall of the pressure vessel in which it is installed, or when present from the face of the refractory lining the inside steel wall of the pressure vessel. For a more detailed description and drawing of a thermocouple, reference is made to coassigned U.S. Pat. No. 4,776,705, which is incorporated herein by reference. However, this reference does not teach applicants' improved Pd-Ag protective sheath 24. Further, it specifies the introduction of an additional purge gas during partial oxidation into a thermowell.

In another embodiment, a refractory thermowell 32 surrounds the previously described sheathed thermocouple. The thermowell may be made fron magnesia, alumina, chrome-magnesia, high chrome, or other high density low porosity refractory. Its purpose is to further protect the thermocouple and the alloy sheath from contact with elements from the slag during operation of the gasifier. The tip 16 of said thermowell may be retracted about 0 to 1¼" from the face 14 of the refractory 9 lining the inside steel wall of the pressure vessel.

In one embodiment, during shutdown or startup of the gasifier when very little hydrogen-containing gas is in the system, the gasifier has an oxidizing atmosphere. A separate stream of hydrogen-containing gas e.g. pure $H_2$, synthesis gas is pumped into the elongated contiguous annular space 38 between the outside of the alloy protective sheath 24 and the inside of the thermowell 32. The hydrogen-containing gas will then permeate the protective alloy sheath By this means, any oxides of vanadium in the +5 oxidation state which may be present are reduced to the lower oxidation states +4, +3, +2. Attack of the thermocouple wires and alloy sheath by oxides of vanadium in the +5 oxidation state is thereby prevented. Reference is made to coassigned U.S. Pat. No. 4,776,705, which is incorporated herein by reference, for a suitable arrangement for pumping the subject hydrogen-containing gas instead of an oxidizing gas into the annular space between the subject alloy protective sheath and the thermowell. Further, see FIG. 1 reference numbers 38 to 43 of U.S. Pat. No. 4,776,705 and the drawing.

EXAMPLE

The following examples are offered as a better understanding of the present invention, but the invention is not to the construed as limited thereto.

A 500 milligram sample of slag from the partial oxidation of Pittsburgh #8 coal by the Texaco Coal partial oxidation Process at a temperature of about 2400° F. and a pressure of about 32 atmospheres was introduced into a platinum crucible. The crucible containing the slag was heated for 18 hrs at a temperature of 2400° F. and then quenched in water. Chemical analysis of the slag specimen (Sample No. 1) and the platinum crucible (Sample No. 2) after being quenched are shown in Table I below.

TABLE I

| Heating Slag From Pittsburg No. 8 Coal In Pt. Crucible | | |
|---|---|---|
| | SAMPLE NO. 1 OXIDES IN SLAG - WT. % | SAMPLE NO. 2 METAL IN CRUCIBLE - WT. % |
| Pt | 4.92 | 72 |
| Fe | 22.50 | 28 |
| Na | 1.32 | — |
| Mg | 0.93 | — |
| Al | 20.78 | — |
| Si | 41.49 | — |
| S | 2.0 | — |
| K | 0.39 | — |
| Ca | 3.35 | — |
| Mn | 0.98 | — |

The experiment was repeated using a crucible made from 65 wt. % palladium and the remainder silver. Chemical analysis of the slag (Sample No. 3) and the Pd-Ag crucible (Sample No. 4) after being quenched are shown in Table II below.

TABLE II

| Heating Slag From Pittsburgh No. 8 Coal In Pd-Ag Crucible | | |
|---|---|---|
| | SAMPLE NO. 3 OXIDES IN SLAG - WT. % | SAMPLE NO. 4 METAL IN CRUCIBLE - WT. % |
| Pd | 0.00 | 65 |
| Ag | 0.00 | 35 |
| Fe | 50.41 | — |
| Na | 0.96 | — |
| Mg | 0.97 | — |
| Al | 9.92 | — |
| Si | 32.00 | — |
| S | 0.00 | — |
| K | 0.09 | — |
| Ca | 4.57 | — |
| Mn | 0.47 | — |

The experiment was repeated using a crucible made from 65 wt. % palladium and the remainder silver. In addition, the feed to the partial oxidation gasifier was coal in admixture with an iron-containing additive. Chemical analyses of the slag (Sample No. 5) and the Pd-Ag crucible (Sample No. 6) after being quenched are shown in Table III below.

TABLE III

| Heating Slag From Pittsburgh No. 8 Coal In Pd-Ag Crucible | | |
|---|---|---|
| | SAMPLE NO. 5 OXIDES IN SLAG - WT. % | SAMPLE NO. 6 METAL IN CRUCIBLE - WT. % |
| Pd | 0.00 | 65 |
| Ag | 0.00 | 35 |
| Fe | 73.23 | — |
| Na | 0.98 | — |
| Mg | 1.03 | — |
| Al | 15.29 | — |
| Si | 2.90 | — |
| S | 6.00 | — |
| K | 0.10 | — |
| Ca | 0.32 | — |
| Mn | 0.15 | — |

Chemical analysis of the slag and Pt crucible, as shown in Table I (Sample Nos. 1 and 2) and as supported by visual microscopic examination of the Pt crucibles shows very severe interaction takes place between the platinum crucible and the slag. Further, platinum is shown to be a sink for iron. In contrast, there is no interaction between the molten slag and the palladium-silver crucible, as shown in Table II (Sample Nos. 3 and 4), Table III Sample Nos. 4 and 5, and by visual microscopic examination. Further, Pd-Ag alloy is not a sink for Fe, either with or without an iron-containing additive.

Various modifications of the invention as herein before set forth may be made without departing from the spirit and scope thereof. Therefore, only such limiations should be made as are indicated in the appended claims.

We claim:

1. In an apparatus comprising a thermocouple for measuring the temperature in a system for the partial oxidation of liquid hydrocarbonaceous and/or solid carbonaceous fuel with a free-oxygen containing gas in the presence of a temperature moderator in the reaction zone of a gasifier to produce an effluent gas stream comprising $H_2$, $CO$, $CO_2$, and at least one member from the group consisting of $H_2O$, $N_2$, $H_2S$, $COS$, $Ar$, and $CH_4$, along with slag containing Fe and other free metals; the improvement comprising a metal sheath for enclosing said thermocouple thereby protecting said thermocouple from exposure to iron and other damaging elements in said slag; and wherein said protective sheath is made from a continuous binary alloy consisting of about 30 to 70 wt. % of palladium and the remainder silver.

2. The apparatus of claim 1 wherein the temperature measured by said thermocouple is in the range of about 1000° F. to 2400° F.

3. The apparatus of claim 1 wherein said gasifier is a vertical free-flow refractory lined cylindrical steel pressure vessel.

4. The apparatus of claim 1 wherein said thermocouple comprises a pair of noble metal wires joined together at both ends but otherwise electrically insulated from each other and from said alloy metal protective sheath by high temperature ceramic material.

5. The apparatus of claim 4 wherein said pair of noble metal wires are platinum/rhodium and said ceramic material is alumina or magnesia.

6. The apparatus of claim 3 wherein said thermocouple enclosed in said metal alloy protective sheath is installed in said gasifier by being passed in succession straight through a flanged nozzle which is attached on the outside of the steel wall of the pressure vessel, then through an aligned hole in the steel wall of the pressure vessel, and then through an aligned hole in the refractory lining the wall on the inside of the pressure vessel.

7. The apparatus of claim 1 wherein the tip of said metal alloy protective sheath is retracted about $\frac{1}{4}$" to 3" from the face of the steel wall on the inside of the pressure vessel, or when present, from the face of the refractory lining the wall on the inside of the pressure vessel.

8. The apparatus of claim 1 wherein a refractory thermowell surrounds said metal alloy protective heath.

9. The apparatus of claim 8 wherein the tip of said thermowell is retracted about 0 to $1\frac{1}{2}$" from the face of the refractory lining the wall on the inside of the pressure vessel.

10. The apparatus of claim 1 wherein said alloy metal protective sheath is pervious to hydrogen, and any vanadium oxide accumulating within said alloy protective sheath is reduced to vanadium and rendered harmless by hydrogen from said effluent gas stream.

11. The apparatus of claim 8 provided with the step at shut-down or start-up when the gasifier has an oxidizing atmosphere of introducing a hydrogen-containing gas into the space between said alloy protective sheath and said thermowell thereby reducing any oxides of vanadium in the +5 oxidation state to oxides of vanadium in the lower oxidation states (+4, +3, +2), and preventing attack of said thermocouple wires and said alloy sheath by said oxides of vanadium in the +5 oxidation state.

12. In an apparatus comprising a thermocouple for measuring temperatures in the range of about 1000° F. to 2400° F. in a system for the partial oxidation of liquid hydrocarbonaceous and/or solid carbonaceous fuel with a free-oxygen containing gas in the presence of a temperature moderator in the reaction zone of a gasifier to produce an effluent gas stream comprising $H_2$, CO, $CO_2$, and at least one member from the group consisting of $H_2O$, $N_2$, $H_2S$, COS, Ar, and $CH_4$, along with slag containing Fe and other free metals; the improvement comprising a metal sheath for enclosing said thermocouple thereby protecting said thermocouple from exposure to iron, vanadium, and other damaging elements in said slag; and wherein said protective sheath is made from a continuous binary alloy which is porous to hydrogen and which consists of about 30 to 70 wt. % of palladium and the remainder silver.

* * * * *